(12) United States Patent
Yu et al.

(10) Patent No.: US 9,070,360 B2
(45) Date of Patent: Jun. 30, 2015

(54) CONFIDENCE CALIBRATION IN AUTOMATIC SPEECH RECOGNITION SYSTEMS

(75) Inventors: Dong Yu, Kirkland, WA (US); Li Deng, Redmond, WA (US); Jinyu Li, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 712 days.

(21) Appl. No.: 12/634,744

(22) Filed: Dec. 10, 2009

(65) Prior Publication Data

US 2011/0144986 A1 Jun. 16, 2011

(51) Int. Cl.
G10L 15/06 (2013.01)
G10L 15/18 (2013.01)
G10L 15/183 (2013.01)
G10L 15/01 (2013.01)

(52) U.S. Cl.
CPC ....................... *G10L 15/01* (2013.01)

(58) Field of Classification Search
CPC ......... G10L 15/01; G10L 15/06; G10L 15/18; G10L 15/183
USPC ................. 704/231, 235, 243, 244, 254, 255, 704/256.2, 257
See application file for complete search history.

(56) References Cited

U.S. PATENT DOCUMENTS

| | | | |
|---|---|---|---|
| 5,602,960 A * | 2/1997 | Hon et al. | 704/207 |
| 5,946,654 A * | 8/1999 | Newman et al. | 704/246 |
| 6,397,179 B2 * | 5/2002 | Crespo et al. | 704/242 |
| 6,418,411 B1 * | 7/2002 | Gong | 704/256.5 |
| 6,539,353 B1 | 3/2003 | Jiang et al. | |
| 6,567,778 B1 * | 5/2003 | Chao Chang et al. | 704/257 |
| 7,010,486 B2 | 3/2006 | Peters | |
| 7,072,836 B2 | 7/2006 | Shao | |
| 7,127,393 B2 * | 10/2006 | Phillips et al. | 704/240 |
| 7,228,275 B1 * | 6/2007 | Endo et al. | 704/235 |
| 7,475,015 B2 | 1/2009 | Epstein et al. | |
| 7,584,099 B2 * | 9/2009 | Ma et al. | 704/240 |
| 7,792,671 B2 * | 9/2010 | Brand | 704/240 |
| 7,856,351 B2 * | 12/2010 | Yaman et al. | 704/9 |
| 8,165,877 B2 * | 4/2012 | Wang et al. | 704/240 |

(Continued)

OTHER PUBLICATIONS

Yu, et al., "Maximum Entropy Based Normalization of Word Posteriors for Phonetic and LVCSR Lattice Search", Retrieved at<<http://research.microsoft.com/en-us/groups/speech/0100965.pdf>>, 2006, IEEE, pp. 965-968.

(Continued)

*Primary Examiner* — Martin Lerner
(74) *Attorney, Agent, or Firm* — Sandy Swain; Judy Yee; Micky Minhas

(57) ABSTRACT

Described is a calibration model for use in a speech recognition system. The calibration model adjusts the confidence scores output by a speech recognition engine to thereby provide an improved calibrated confidence score for use by an application. The calibration model is one that has been trained for a specific usage scenario, e.g., for that application, based upon a calibration training set obtained from a previous similar/corresponding usage scenario or scenarios. Different calibration models may be used with different usage scenarios, e.g., during different conditions. The calibration model may comprise a maximum entropy classifier with distribution constraints, trained with continuous raw confidence scores and multi-valued word tokens, and/or other distributions and extracted features.

20 Claims, 5 Drawing Sheets

(56) References Cited

U.S. PATENT DOCUMENTS

| | | | | |
|---|---|---|---|---|
| 8,195,459 | B1* | 6/2012 | Brand | 704/240 |
| 8,285,542 | B2* | 10/2012 | Yu et al. | 704/10 |
| 8,793,130 | B2* | 7/2014 | Wang et al. | 704/240 |
| 2001/0041978 | A1* | 11/2001 | Crespo et al. | 704/257 |
| 2002/0087315 | A1* | 7/2002 | Lee et al. | 704/256 |
| 2002/0133340 | A1* | 9/2002 | Basson et al. | 704/235 |
| 2003/0120486 | A1 | 6/2003 | Brittan et al. | |
| 2004/0006465 | A1* | 1/2004 | Phillips et al. | 704/240 |
| 2004/0158469 | A1* | 8/2004 | Brand | 704/240 |
| 2005/0055209 | A1* | 3/2005 | Epstein et al. | 704/255 |
| 2006/0026003 | A1* | 2/2006 | Carus et al. | 704/275 |
| 2006/0229862 | A1* | 10/2006 | Ma et al. | 704/4 |
| 2007/0129936 | A1* | 6/2007 | Wang et al. | 704/9 |
| 2008/0059153 | A1* | 3/2008 | Bennett | 704/9 |
| 2008/0097936 | A1 | 4/2008 | Schmidtler et al. | |
| 2008/0183468 | A1* | 7/2008 | Brand | 704/235 |
| 2008/0183649 | A1 | 7/2008 | Farahani et al. | |
| 2008/0215320 | A1* | 9/2008 | Wu et al. | 704/231 |
| 2009/0030686 | A1* | 1/2009 | Weng et al. | 704/240 |
| 2009/0037175 | A1* | 2/2009 | Wang et al. | 704/251 |
| 2009/0083034 | A1* | 3/2009 | Hernandez et al. | 704/251 |
| 2010/0023331 | A1* | 1/2010 | Duta et al. | 704/257 |
| 2010/0121644 | A1* | 5/2010 | Glasser | 704/273 |
| 2010/0256977 | A1* | 10/2010 | Yu et al. | 704/240 |
| 2010/0268536 | A1* | 10/2010 | Suendermann et al. | 704/243 |
| 2011/0135639 | A1* | 6/2011 | Yu et al. | 424/133.1 |
| 2012/0185252 | A1* | 7/2012 | Wang et al. | 704/251 |

OTHER PUBLICATIONS

"SREC Architecture", at<<http://www.netmite.com/android/mydroid/cupcake/external/srec/doc/SREC_Architecture.pdf>>, Aug. 14, 2008, pp. 1-24.

Jiang, Hui, "Confidence Measures for Speech Recognition: A Survey" at<<http://www.cse.yorku.ca/~hj/mypubs/Jiang_sc05.pdf>>, Science Direct, 2005, Speech communication, vol. 45, pp. 455-470.

Brummer, et al., "On Calibration of Language Recognition Scores", at<<http://niko.brummer.googlepages.com/CalibrationOfLanguageScores.pdf>>, Speaker and Language Recognition Workshop, 2006. IEEE Odyssey 2006, Jun. 28-30, 2006, pp. 8.

Martin, et al., "The DET Curve Assessment of Detection Task Performance", Retreived at <<http://www.itl.nist.gov/iad/mig/publications/storage_paper/det.pdf>>, In Proceedings. Eurospeech, 1997, pp. 1895-1898.

Riedmiller et al., "A Direct Adaptive Method for Faster Back-Propagation Learning: The RPROP", at<<Algorithm, Retreived at <<http://ieeexplorejeee.org/stamp/stamp.jsp?tp=&arnumber=298623&isnumber=7404>>, IEEE International Conference on Neural Networks, vol. 1, 1993., pp. 586-591.

White, et al., "Maximum Entropy Confidence Estimation for Speech Recognition", Retrieved at<< http://ieeexplore.ieee.org/stamp/stamp.jsp?tp=&arnumber=4218224&isnumber=4218011>>,IEEE International Conference on Acoustics, Speech and Signal Processing, vol. 4, Apr. 15-20, 2007, pp. IV-809-IV-812.

Yu, et al., "A Novel Framework and Training Algorithm for Variable-Parameter Hidden Markov Models", at<<http://ieeexplore.ieee.org/stamp/stamp.jsp?tp=&arnumber=5165118&isnumber=5165109>>, IEEE Transactions on Audio, Speech, and Language Processing, vol. 17, No. 7, Sep. 2009, pp. 1348-1360.

Yu, et al., "Using continuous features in the maximum entropy model", at<<http://research.microsoft.com/pubs/81511/ContinuousFeaturesInMaxEnt-PatternRecogLetter-2009.pdf>>, Pattern Recognition Letters, vol. 30, No. 14, Oct. 2009, pp. 1295-1300.

Yu, et al., "Solving Nonlinear Estimation Problems Using Splines", at<<http://ieeexplorejeee.org/stamp/stamp.jsp?tp=&arnumber=5174502&isnumber=5174379>>, IEEE Signal Processing Magazine, vol. 26, No. 4, Jul. 2009, pp. 86-90.

Yu, et al., "Hidden Conditional Random Field with Distribution Constraints for Phone Classification", at<<http://research.microsoft.com/pubs/102556/HCRF-DC-PhoneClass-Interspeech2009.pdf>>, Sep. 6-10, 2009, pp. 676-679.

Yu, et al., "An Introduction to Voice Search", Retreived at <<http://www.cs.toronto.edu/~gpenn/csc2518/voicesearch.pdf>>, IEEE Signal Processing Magazine, May 2008, pp. 29-38.

Yu, et al., "N-Gram Based Filler Model for Robust Grammar Authoring", at<<http://ieeexplore.ieee.org/stamp/stamp.jsp?tp=&arnumber=1660083&isnumber=34757>>, IEEE International Conference on Acoustics, Speech and Signal Processing, 2006, vol. 1, May 14-19, 2006, pp. I-I.

Yu, et al., "Automated Directory Assistance System—From Theory to Practice", at<<http://citeseerx.ist.psu.edu/viewdoc/download?doi=10.1.1.131.8010&rep=rep1&type=pdf>>, In Proceedings of Interspeech, Aug. 27-31, pp. 2709-2712.

* cited by examiner

CONFIDENCE CALIBRATION IN AUTOMATIC SPEECH RECOGNITION SYSTEMS

BACKGROUND

While automatic speech recognition accuracy has improved over the years, the recognition results of spontaneous automatic speech recognition systems still contain a large amount of errors, especially under noisy conditions. Such systems are thus frustrating for people to use, as well as costly for businesses that save or make money based upon how accurate their systems are. For example, because of incorrect automatic speech recognition on incoming telephone calls, a business has to pay backup support personnel to manually handle the calls, whereby the more accurate the speech recognition system, the less the number of support personnel needed.

Automatic speech recognition engines provide speech applications (e.g., interactive dialog systems) with a word and semantic confidence score (measure) representing an estimate of the likelihood that each word/semantic slot is correctly recognized. In order for speech applications to make reasonable decisions, such estimates need to be accurate. For example, a decision as to where to route a telephone call (versus asking the caller to repeat) may be based on the estimate exceeding a threshold value.

The confidence score is typically provided by automatic speech recognition engines, which use one fixed set of model parameters obtained by training on a generic data set for all applications. This approach has drawbacks. One drawback is that the data used to train the confidence score may differ significantly from the real data observed in a specific speech application, generally due to different language models used and different environments in which the applications are deployed. Another drawback is that some information that is available in the training data cannot be used in the generic confidence model, because such information is application-specific, and cannot be reliably estimated from the generic data set for a given application. As a result, the confidence score provided by speech recognition engines can be far from optimal for a specific application.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a calibration model is inserted into a speech recognition system to adjust the confidence score output by a speech recognition engine (recognizer), and thereby provide a calibrated confidence score for use by an application. The calibration model is one that has been trained for a specific usage scenario, e.g., for that application, based upon a calibration training set obtained from at least one previous corresponding usage scenario. The usage scenario may correspond to a current condition, with another calibration model (or no calibration model) used when a different condition exists, e.g., one calibration model may be used during a noisy condition and another during a non-noisy condition.

In one implementation, the calibration model comprises a maximum entropy classifier with distribution constraints. The classifier may be trained with continuous raw confidence scores and multi-valued word tokens. Other training features include word token distribution-related features and word-score information-related features, sub-word unit (e.g., phoneme) distribution, raw word confidence scores and raw semantic confidence scores, internal information of the speech recognition engine and/or keyword coverage information.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards improving the quality of the confidence score output by a speech recognition engine by calibrating the confidence score with a calibration model trained for various usage scenarios. In one implementation, a calibration model trained for a specific usage scenario calibrates (modifies) the confidence score output by the speech recognition engines to adjust for that specific usage scenario.

It should be understood that any of the examples described herein are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, model training, and speech recognition in general.

Figure 1:
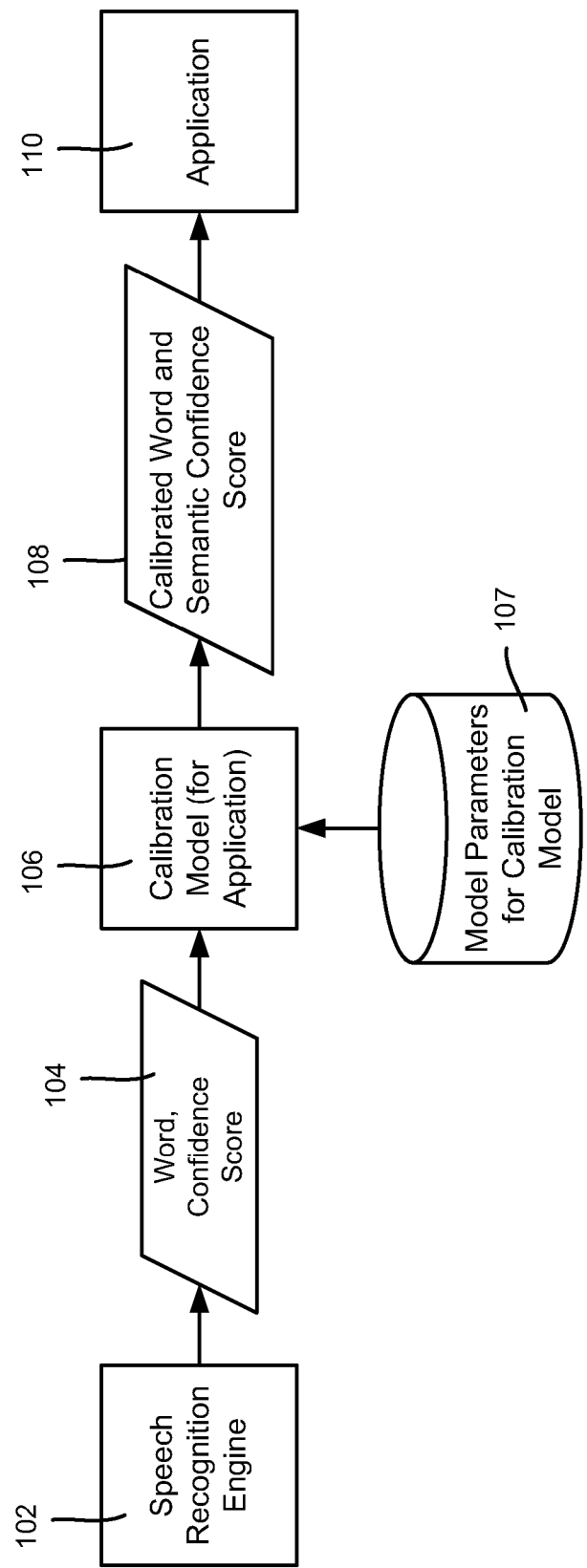
FIG. 1 is a block diagram showing example components for calibrating the score output by a speech recognition engine for a specific application.

FIG. 1 shows various aspects related to improving the quality of a speech recognition engine's confidence score by calibrating the score for each specific usage scenario. In general, a speech recognition engine 102 outputs a confidence score 104, which is received by a calibration model 106 using model parameters obtained via training (as described below). In general, the calibration model 106 adjusts the confidence score 104 to an adjusted confidence score 108, which is then provided to an application 110, such as one that makes a decision based upon the adjusted confidence score 108 received.

The calibration model 106 is one that is trained for the usage scenario, which may be specific to the application and/or possibly dynamically substituted based upon current conditions that correspond to the usage scenario. For example, in a noisy situation, a calibration model trained under noisy conditions may be used in place of a normal noise-level calibration model. Other variable conditions may include grammar (e.g., different context free grammar or n-gram for different dialog turn), different speakers (e.g., dialect or accent, and/or a low versus high voice). For example, if a telephone call is received from one location versus another (e.g., as detected via caller ID), a calibration model trained for that location's accent/dialect may be dynamically selected for use. Alternatively, the accent/dialect may be otherwise detected and used to select an appropriate calibration model.

Note that the calibration model 106 is trained for that application 110 and/or usage scenario based upon transcribed calibration data typically collected under real usage scenarios for the application. As a result, the adjusted confidence score 108 is more accurate than the original confidence score 104. In actual evaluations, implementing the calibration model 106 reduced the word and semantic confidence equal error rate by approximately thirty percent on average.

The calibration model 106 and its associated learned model parameters 107 may comprise any suitable classifier. While a maximum entropy classifier is used herein in the various examples, other types of classifiers may perform such calibration, including those based upon naïve Bayes, neural network, and/or logistic regression.

Figure 2:
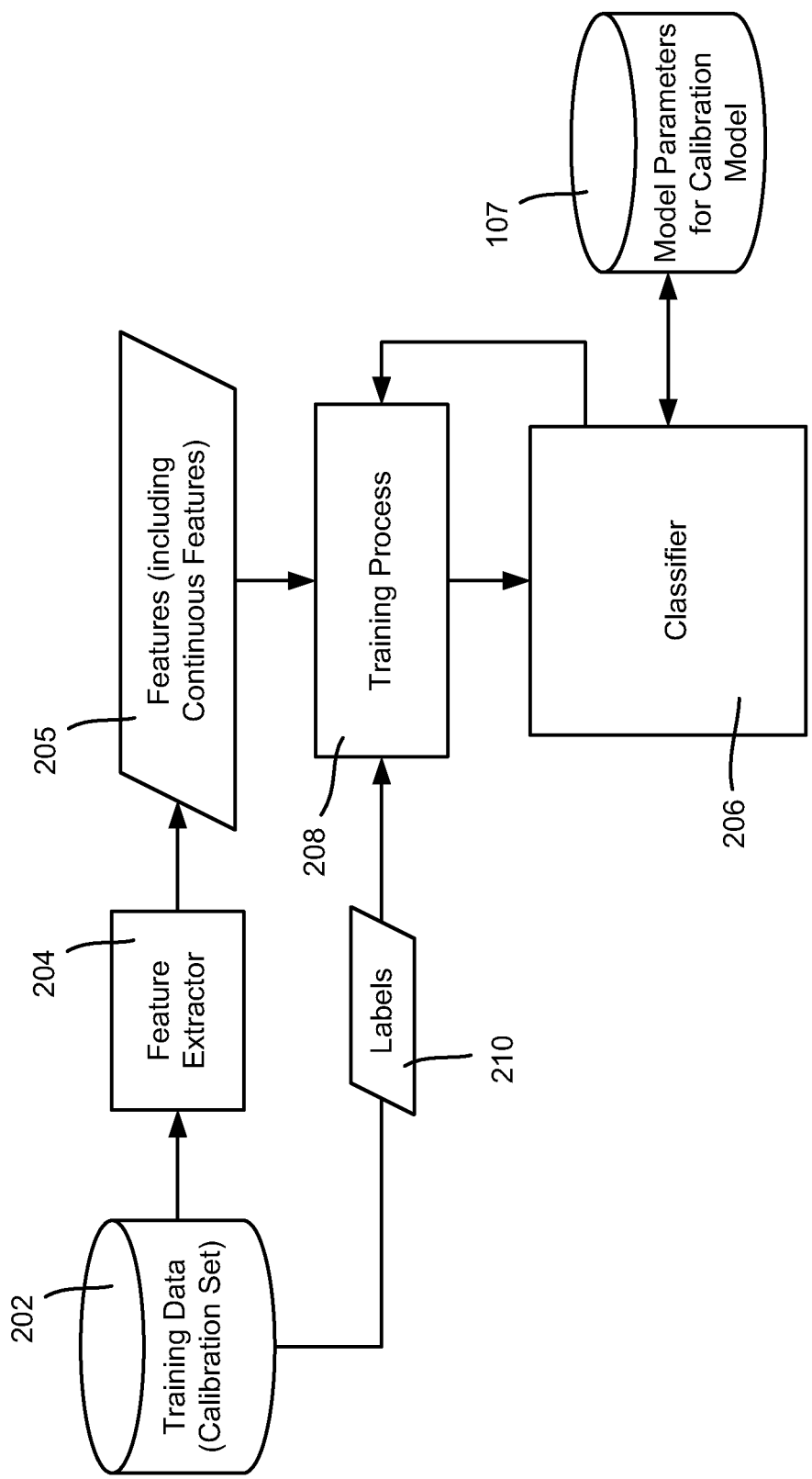
FIG. 2 is a block diagram showing example components for training a classifier to obtain model parameters for use by a calibration model.

FIG. 2 shows a training environment, in which labeled training data 202 (a calibration set obtained by labeling recognition-related results from one or more actual usage scenarios of any given application) is used to learn the model parameters 107. In general, a feature extractor 204 that is appropriate for the type of training data extracts features 205 from the training data 202. A training process 208 in conjunction with the classifier being trained 206 uses the labels 210 of the labeled training data to learn the model parameters 107 for use in classification. As is known, such training may be iterative to converge on the model parameters 107.

Various types of features may be extracted for use in training, depending on the type of classifier being trained and what information is available. Most of the examples herein are directed towards word-based and confidence score-based features (e.g., distributions), however other features may be used if available, such as engine internal information (e.g., the N-best results, and the acoustic and language model scores) and the keyword coverage information.

In addition to word-level recognition and/or training, note that calibration training may occur at levels, including at a sub-word unit (e.g., phoneme) level, a semantic level, a sentence level and so on. As used herein, the term "word" encompasses these concepts unless otherwise explicitly differentiated. For example, in the examples below "word" distribution is described using words, however this applies to phoneme distribution which is equivalent.

Turning to a more particular example of training a maximum entropy classifier, given a set of N confidence scores and the associated labels $\{(c_i \in [0,1], y_i \in \{0,1\}) | i=1, \ldots, N\}$, where $y_i=1$ if the word is correct and $y_i=0$ otherwise, the quality of the confidence score may be evaluated, such as by using four popular criteria. A first criterion is mean square error (MSE):

$$MSE = \frac{1}{N}\sum_{i=1}^{N}(c_i - y_i)^2. \quad (1)$$

A second criterion is negative normalized log-likelihood (NNLL):

$$NNLL = -\frac{1}{N}\sum_{i=1}^{N}\log(c_i\delta(y_i=1) + (1-c_i)\delta(y_i=0)), \quad (2)$$

where $\delta(x)=1$ if x is true and 0 otherwise. A third criterion is equal error rate (EER), and a fourth criterion is the detection error trade-off (DET) curve, the crossing of which with the (0,0)-(1,1) diagonal line gives the EER.

In one implementation a confidence calibration approach is based on a maximum entropy (MaxEnt) model with distribution constraints, as described in U.S. patent application Ser. No. 12/416,161, herein incorporated by reference. In the following example, the MaxEnt model uses confidence score distribution and word distribution information. By way of background, a MaxEnt model with moment constraints is a known discriminative model used in classifier design. Given an N-sample training set $\{(x_n,y_n) | n=1, \ldots, N\}$ and a set of M features $f_i(x,y), i=1, \ldots, M$ defined on the input x and output y, the posterior probability $$p(y|x;\lambda) = \frac{1}{Z_\lambda(x)}\exp\left(\sum_i x_i f_i(x,y)\right) \quad (3)$$

is in a log-linear form, where $Z_\lambda(x)=\Sigma_y \exp(\Sigma_i \lambda_i f_i(x,y))$ is a normalization constant to fulfill the probability constraint $\Sigma_y p(y|x)=1$, and $\lambda_i$ is optimized to maximize the log-conditional-likelihood $$O(\lambda) = \sum_{i=1}^{N}\log p(y_n|x_n) \quad (4)$$

over the whole training set. While the MaxEnt model with moment constraints model can achieve high classification accuracy when binary features are used, it is not as successful when continuous features are used.

Instead, the MaxEnt model with distribution constraints uses the information carried in the feature distributions to improve classification performance. To use the MaxEnt model with distribution constraints, features are classified into three categories, namely binary, continuous, and multi-valued nominal features. For the binary features, the distribution constraint is the same as the moment constraint and thus no change is needed from the moment-based model. For the continuous features, each feature $f_i(x,y)$ is expanded to K features $$f_{ik}(x,y)=a_k(f_i(x,y))f_i(x,y), \quad (5)$$

where $a_k(.)$ is a known weight function and the number K is determined based upon the amount of training data available. For multi-valued nominal features, the feature values are sorted in descending order based upon their number of occurrences. The top J−1 nominal values are mapped into token IDs in [1,J−1], and the remaining nominal values are mapped into the same token ID J, where J is chosen to guarantee the distribution of the nominal features can be reliably estimated. Each feature $f_i(x,y)$ is subsequently expanded to J features $$f_{ij}(x,y)=\delta(f_i(x,y)=j). \quad (6)$$

After the feature expansion for the continuous and the multi-valued nominal features, the posterior probability in the MaxEnt with distribution constraints model can be evaluated as:

$$p(y \mid x) = \frac{1}{Z_\lambda(x)} \exp\left( \sum_{i \in \{binary\}} \lambda_i f_i(x, y) + \sum_{i \in \{continuous\},k} \lambda_{ik} f_{ik}(x, y) + \sum_{i \in \{nominal\},j} \lambda_{ij} f_{ij}(x, y) \right) \quad (7)$$

Parameter estimation can be carried out in the same way as that used in the MaxEnt with moment constraints model; one way is to use the known RPROP training algorithm.

As described herein, the MaxEnt with distribution constraints model may be used to calibrate the confidence scores. In one implementation, the MaxEnt with distribution constraints model is used with constraints on both continuous raw confidence scores and multi-valued word tokens.

In the confidence calibration setting, one implementation assumes that only the word and "raw" confidence score sequences of $$\left\{ x_{n,t} = \begin{bmatrix} w_{n,t} \\ c_{n,t} \end{bmatrix} \middle| t = 1, \ldots, T \right\} \quad (8)$$

are available from the automatic speech recognition engine, where $w_{n,t}$ is the t-th word in the n-th utterance and $c_{n,t}$ is the associated confidence score. As described herein, a general goal of confidence calibration is to derive an improved confidence score $C'_{n,t}=p(y_{n,t}|x_{n,t};\lambda)$ for each word $w_{n,t}$. The training (calibration) set includes a label for each word that indicates whether that recognized word is correct (true) or not (false), from which the parameters of the MaxEnt with distribution constraints model are trained.

Note that in one implementation, the available information comprises the current word's confidence score $c_{n,t}$, along with the previous and next words' confidence scores, $c_{n,t-1}$ and $c_{n,t+i}$, since an error in one place can affect the adjacent words. Moreover, the recognized words themselves also contain information, such as their frequencies in voice mail transcription data sets and command and control data sets.

Still further, features may be based on keyword coverage information; e.g., based upon some grammar rule, given a sequence of words, the number of words in the keyword grammar rule divided by the number of words recognized in the sequence provides a numerical ratio. For example, if an eight word sequence is "need the telephone number for Microsoft Corporation please," and the rule selects "Microsoft Corporation" as being the main part of the sequence (with "need the telephone number for" being a preamble and "please" being a postscript), then the ratio is two words "Microsoft Corporation" to the eight total words in the sequence, or 0.25, and this coverage feature value may be used in the training.

In general, the distributions are often significantly different across words and tasks, and thus constraints on the distribution of the words supplies useful information to the MaxEnt model. In addition, the distribution of the confidence scores across words is also often significantly different, whereby constraints on the joint distribution of words and confidence scores also provide useful information.

Based on the above, various approaches for using the word and confidence distribution information in the MaxEnt with distribution constraints model are available; three are described herein. In a first approach, scores and words are modeled separately, whereby four features (two score features, one each for positive and negative, plus two word features, one each for positive and negative) are constructed for each frame (n, t); $y_{n,t}$ represents the label:

$$f_1(x_{n,t}, y_{n,t}) = \begin{cases} c_{n,t} & \text{if } y_{n,t} = \text{true} \\ 0 & \text{otherwise} \end{cases} \quad (9)$$

$$f_2(x_{n,t}, y_{n,t}) = \begin{cases} c_{n,t} & \text{if } y_{n,t} = \text{false} \\ 0 & \text{otherwise} \end{cases} \quad (10)$$

$$f_3(x_{n,t}, y_{n,t}) = \begin{cases} w_{n,t} & \text{if } y_{n,t} = \text{true} \\ 0 & \text{otherwise} \end{cases} \quad (11)$$

$$f_4(x_{n,t}, y_{n,t}) = \begin{cases} w_{n,t} & \text{if } y_{n,t} = \text{false} \\ 0 & \text{otherwise} \end{cases} \quad (12)$$

If context information is used, features constructed for the previous and next frames may be used. Note that in this approach the weight on the raw confidence score is shared across the words. However, different bias weights may be used for different words because:

$$p(y \mid x) = \frac{1}{Z_\lambda(x)} \exp\left( \sum_{i \in \{1,2\},k} \lambda_{ik} f_{ik}(x, y) + \sum_{i \in \{3,4\},j} \lambda_{ij} \delta(f_i(x, y) = j) \right) \quad (13)$$

In a second approach, the distribution of the words and confidence scores are jointly modeled and two features are constructed for each word j at each frame:

$$f_{2j-1}(x_{n,t}, y_{n,t}) = \begin{cases} c_{n,t} & \text{if } w_{n,t} = j \ \& \ y_{n,t} = \text{true} \\ 0 & \text{otherwise} \end{cases} \quad (14)$$

$$f_{2j}(x_{n,t}, y_{n,t}) = \begin{cases} c_{n,t} & \text{if } w_{n,t} = j \ \& \ y_{n,t} = \text{false} \\ 0 & \text{otherwise} \end{cases} \quad (15)$$

This approach basically uses distinct weights on the raw confidence score but shares the same bias weight for different words.

In a third approach, two more features are added for each frame, in addition to the features used in the second approach:

$$f_{2J+1}(x_{n,t}, y_{n,t}) = \begin{cases} w_{n,t} & \text{if } y_{n,t} = \text{true} \\ 0 & \text{otherwise} \end{cases} \quad (16)$$

$$f_{2J+2}(x_{n,t}, y_{n,t}) = \begin{cases} w_{n,t} & \text{if } y_{n,t} = \text{false} \\ 0 & \text{otherwise} \end{cases} \quad (17)$$

This approach uses different weights on the confidence scores and different bias weights for different words.

In one alternative, the training system also has access to the raw semantic confidence score $c_n^s$ of the n-th trial (utterance) as well as the recognized words $w_{n,t}$ and the corresponding raw word confidence scores $c_{n,t}$ for each semantic slot from the automatic speech recognition engine. That is, the system has the observation vector of:

$$x_n = \left(c_n^s, \begin{bmatrix} w_{n,1} \\ c_{n,1} \end{bmatrix}, \begin{bmatrix} w_{n,2} \\ c_{n,2} \end{bmatrix}, \ldots, \begin{bmatrix} w_{n,T} \\ c_{n,T} \end{bmatrix}\right). \quad (18)$$

As before, a general goal is to derive an improved semantic confidence score, which in this alternative is $c_n^s = p(y_n | x_n; \lambda)$. Note that the training (calibration) set indicates whether the derived semantic information and each recognized word is correct (true) or not (false), from which the parameters of the MaxEnt with distribution constraints model are trained.

The word and word confidence score sequences contain a variable number of elements, while the MaxEnt with distribution constraints model uses a fixed number of features. Because whether the semantic information retrieved is correct or not is determined primarily by the least confident words, the word confidence scores are sorted in ascending order, with only the "top" (least confident) M word confidence scores and the associated words kept. The discarded information is thus kept at a minimum. The top M sorted words and confidence scores are denoted as:

$$\begin{bmatrix} \overline{w}_{n,1} \\ \overline{c}_{n,1} \end{bmatrix}, \begin{bmatrix} \overline{w}_{n,2} \\ \overline{c}_{n,2} \end{bmatrix}, \ldots, \begin{bmatrix} \overline{w}_{n,M} \\ \overline{c}_{n,M} \end{bmatrix}. \quad (19)$$

Two features may be constructed based on the raw semantic confidence scores:

$$f_1(x_n, y_n) = \begin{cases} c_n^s & \text{if } y_n = \text{true} \\ 0 & \text{otherwise} \end{cases} \quad (20)$$

$$f_2(x_{n,t}, y_{n,t}) = \begin{cases} c_n^s & \text{if } y_n = \text{false} \\ 0 & \text{otherwise} \end{cases} \quad (21)$$

In addition, four features are constructed for each pair of word $\overline{w}_{n,t}$ and confidence $\overline{c}_{n,t}$ in the top M list:

$$f_{4t-1}(x_n, y_n) = \begin{cases} \overline{c}_{n,t} & \text{if } y_{n,t} = \text{true} \\ 0 & \text{otherwise} \end{cases} \quad (22)$$

$$f_{4t}(x_n, y_n) = \begin{cases} \overline{c}_{n,t} & \text{if } y_{n,t} = \text{false} \\ 0 & \text{otherwise} \end{cases} \quad (23)$$

$$f_{4t+1}(x_n, y_n) = \begin{cases} \overline{w}_{n,t} & \text{if } y_{n,t} = \text{true} \\ 0 & \text{otherwise} \end{cases} \quad (24)$$

$$f_{4t+2}(x_n, y_n) = \begin{cases} \overline{w}_{n,t} & \text{if } y_{n,t} = \text{false} \\ 0 & \text{otherwise} \end{cases} \quad (25)$$

Figure 3:
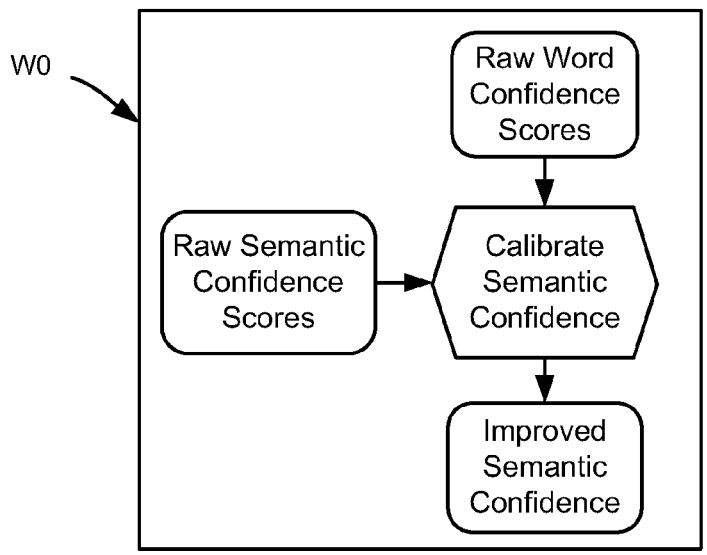
FIG. 3 is a flow diagram representation of how word confidence scores and semantic confidence scores may be used to improve semantic confidence for use in a calibration model.

In the above formulation, the raw word confidence scores are directly used when constructing features. This technique for using the word confidence scores is denoted W0 in FIG. 3.

Figure 4:
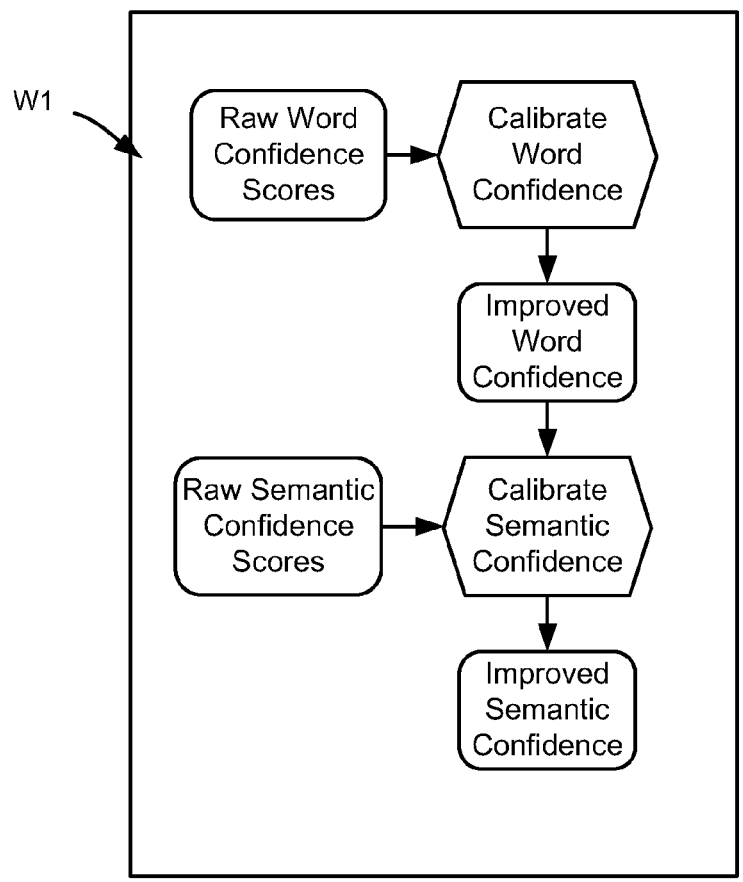
FIG. 4 is a flow diagram representation of how word confidence scores may be calibrated and then used with semantic confidence scores to improve semantic confidence for use in a calibration model.

Another technique for using the word confidence scores is denoted W1, and is represented in FIG. 4. More particularly, the quality of word confidence scores can be significantly improved using the calibration algorithm described above with reference to equations (8)-(17). As improved word confidence scores often translate to better features and subsequently improved calibrated semantic confidence scores, the W1 technique first obtains the improved word confidence scores, and then uses the improved word confidence scores with raw semantic confidence scores when calibrating semantic confidence.

The quality of the calibrated semantic confidence scores may be further improved because some word recognition errors do not affect the desired semantic information. For example, whether "May 15" is recognized as "May Fifteen" or "May Fifteenth" does not change the desired meaning. Such errors may be disregarded when calibrating the word confidence scores.

Figure 5:
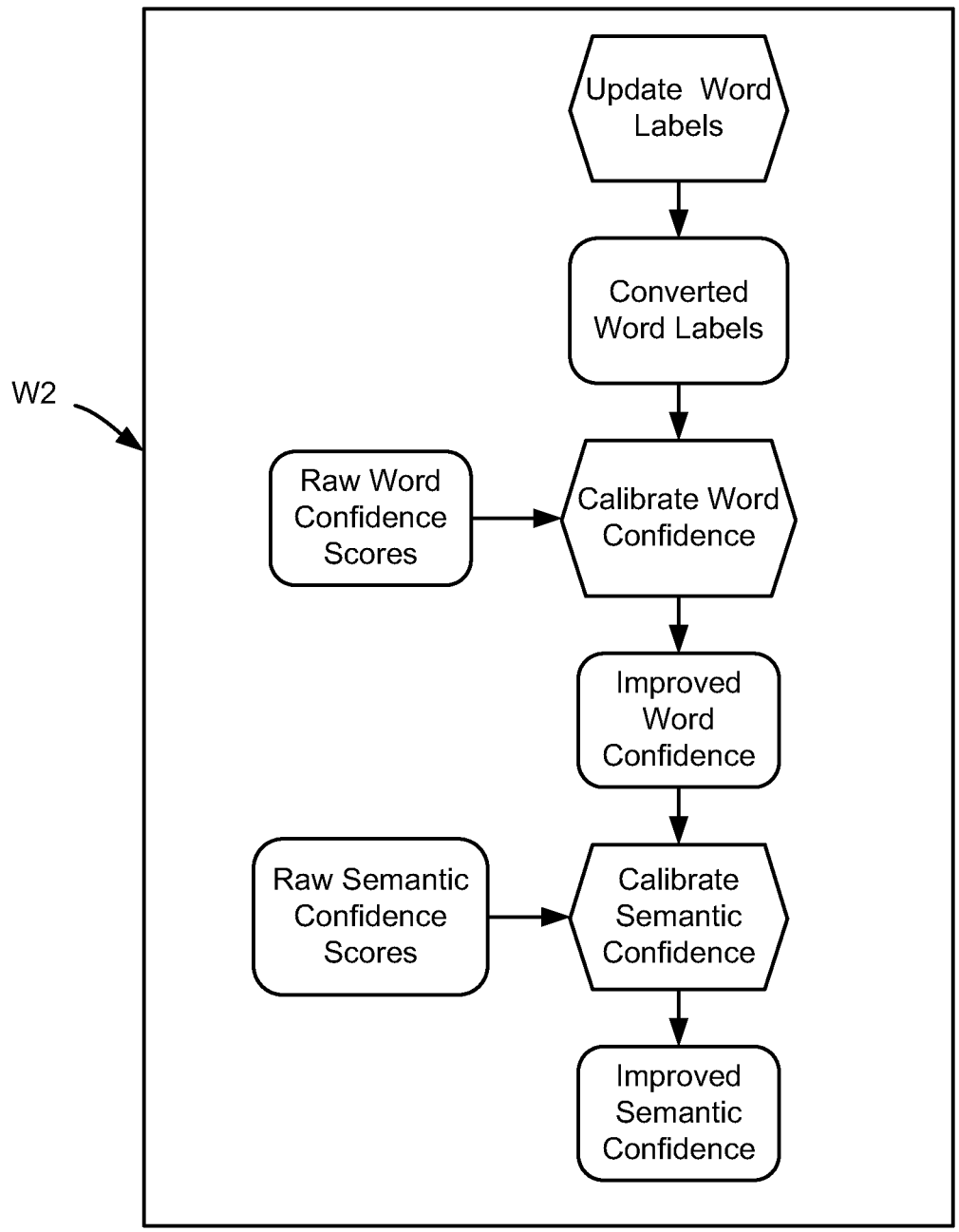
FIG. 5 is a flow diagram representation of how training data word labels may be updated and converted for use in calibrating word confidence scores that are then used with semantic confidence scores to improve semantic confidence for use in a calibration model.

To this end, if the semantic information is correct (true) in the calibration set, the labels of any related words are converted to true (e.g., by a program or the like). The word confidence scores are then calibrated using the converted labels. This technique is denoted as W2, and is represented in FIG. 5.

As can be seen, the technology provides for calibrating confidence scores for each usage scenario, such as speech application, grammar, and/or semantic slot. In one implementation, a maximum entropy model with distribution constraints is used to calibrate the confidence scores. Features for training the model may be based on the word token distribution and word-score distribution, however other features may be used, including engine-internal information and coverage information. The word confidence may first be calibrated into improved word confidence that is then used to calibrate the semantic confidence. Further, based on semantic information, word labels may be updated before the word confidence calibration step to further improve the semantic confidence.

Exemplary Operating Environment

Figure 6:
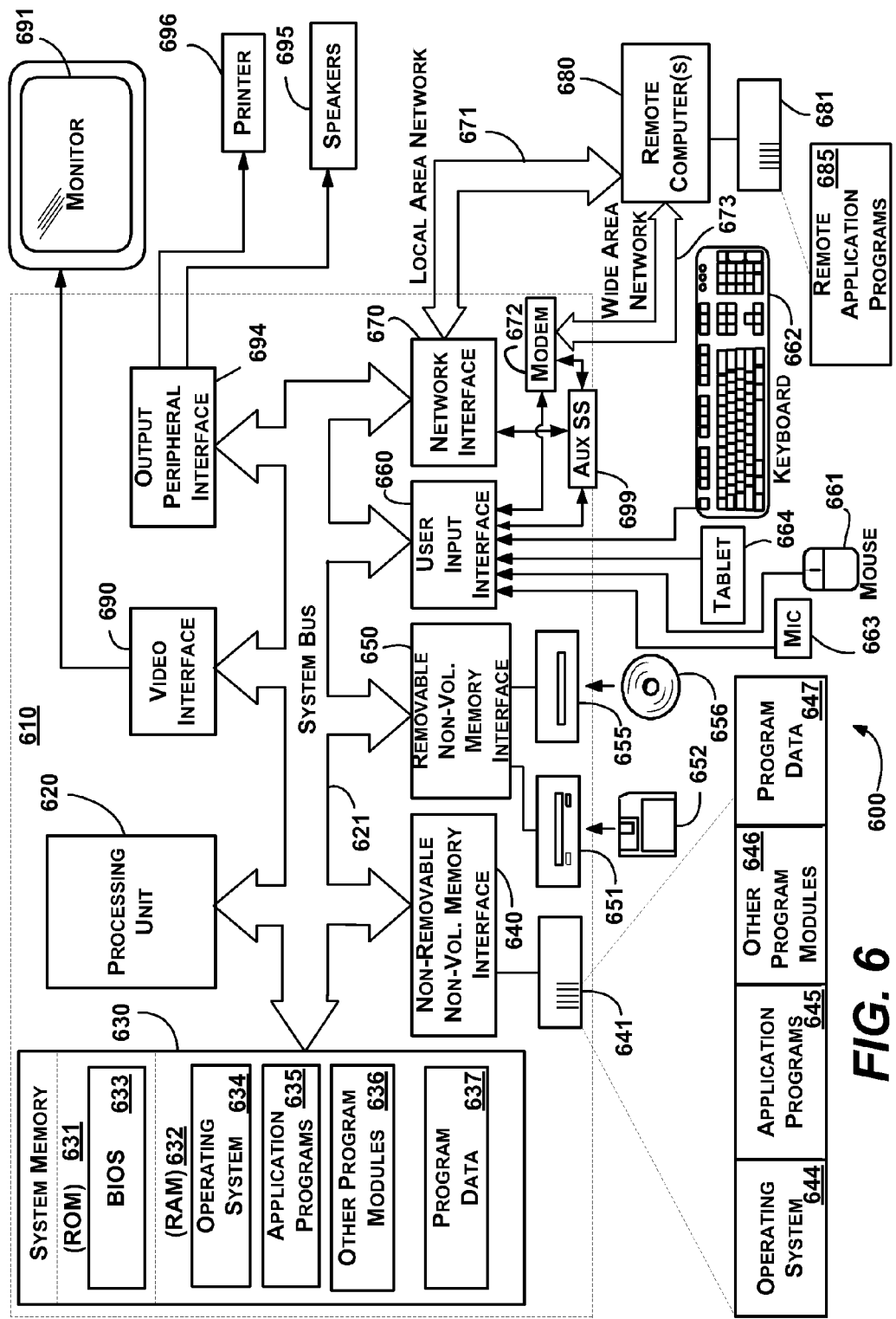
FIG. 6 shows an illustrative example of a computing environment into which various aspects of the present invention may be incorporated.

FIG. 6 illustrates an example of a suitable computing and networking environment 600 on which the examples of FIGS. 1-5 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610.

Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system comprising:
   one or more processors;
   a memory coupled to the one or more processors;
   a calibration model, dynamically selected by and implemented on the one or more processors based on a current condition, the calibration model having been trained for a usage scenario that corresponds to the current condition, the calibration model configured to receive a word confidence score and a semantic confidence score from a speech recognition engine, and configured to adjust the word confidence score to provide a calibrated word confidence score for use by an application, and further configured to adjust the semantic confidence score using the calibrated word confidence score to provide a calibrated semantic confidence score for use by the application, the calibration model having been trained for the usage scenario based upon a calibration training set obtained from at least one previous corresponding usage scenario.

2. The system of claim 1 wherein the usage scenario corresponds to at least one of the application, grammar, or semantic slot.

3. The system of claim 1 wherein the usage scenario corresponds to a current condition, and further comprising, another calibration model that is used when a different condition exists.

4. The system of claim 1 wherein the calibration model comprises a maximum entropy classifier with distribution constraints.

5. The system of claim 4 wherein the maximum entropy classifier with distribution constraints is trained using continuous raw confidence scores and multi-valued word tokens.

6. The system of claim 1 wherein the calibration model is configured to adjust the word confidence score based upon training with features, including word token distribution related features and word-score information related features obtained from the previous corresponding usage scenario.

7. The system of claim 1 wherein the calibration model uses raw word confidence scores and raw semantic confidence scores to provide improved semantic confidence scores.

8. The system of claim 1 wherein the calibration model is configured to calibrate raw word confidence scores into improved word confidence scores, and uses the improved word confidence scores and raw semantic confidence scores to provide improved semantic confidence scores.

9. The system of claim 1 wherein the calibration model uses semantic data to convert at least some word labels in the calibration training set to converted word labels, wherein the converted word labels and unconverted word labels provide a set of updated word labels, and wherein the calibration model uses the updated word labels to calibrate raw word confidence scores into improved word confidence scores, and uses the improved word confidence scores and raw semantic confidence scores to provide improved semantic confidence scores.

10. The system of claim 1 wherein the calibration model is trained with features extracted from the calibration training set.

11. The system of claim 10 wherein at least one of the features is based upon sub-word unit distribution.

12. The system of claim 10 wherein at least one of the features is based upon internal information of the speech recognition engine.

13. The system of claim 10 wherein at least one of the features is based upon keyword coverage information.

14. In a computing environment, a method comprising:
   training a calibration model, implemented on one or more processors, for use in adjusting confidence scores output by a speech recognizer in a usage scenario, including processing a calibration training set corresponding to the usage scenario containing words, confidence scores, and labels indicating whether each word was correctly recognized, extracting features from the calibration training set corresponding to the usage scenario, the features including word and score distribution features, keyword coverage values, and at least one of sub-word units, semantics, or sentences, and using the features and continuous confidence scores to train the calibration model for the usage scenario, wherein the calibration model is dynamically selected based upon a current condition that corresponds to the usage scenario.

15. The method of claim 14 further comprising:
   using the calibration model to adjust the confidence scores output by the speech recognizer in the usage scenario that corresponds to the usage scenario in which the words and confidence scores in the calibration training set were obtained.

16. The method of claim 14 wherein training the calibration model comprises:
   a) modeling a score and a word separately for each frame, including using a label associated with the word to provide a positive score feature, a negative score feature, a positive word feature and a negative word feature; or
   b) modeling a score and a word jointly for each frame, including using a label associated with the word to provide a positive feature and a negative feature.

17. The method of claim 16 further comprising:
   using context information to construct features for previous and next frames.

18. The method of claim 14 wherein training the calibration model comprises using features that provide independent weights for the confidence scores and independent bias weights for different words.

19. The method of claim 14 wherein training the calibration model comprises:

a) using raw word confidence scores and raw semantic confidence scores to provide improved semantic confidence scores, or
b) calibrating raw word confidence scores into improved word confidence scores, and using the improved word confidence scores and raw semantic confidence scores to provide improved semantic confidence scores; or
c) using semantic information to convert at least some word labels in the calibration training set to converted word labels which, along with unconverted word labels, provide a set of updated word labels, and using the updated word labels to calibrate raw word confidence scores into improved word confidence scores, and using the improved word confidence scores and raw semantic confidence scores to provide improved semantic confidence scores.

20. One or more computer storage devices having computer-executable instructions, which in response to execution by a computer, cause the computer to perform steps comprising:

dynamically selecting a calibration model based on a current usage scenario, the calibration model having been trained using data obtained from one or more previous usage scenarios corresponding to the current usage scenario;

receiving a raw word confidence score and a raw semantic confidence score from a speech recognition engine at the calibration model;

adjusting the raw word confidence score using continuous confidence scores to output a calibrated word confidence score for the current usage scenario; and adjusting the raw semantic confidence score using the calibrated word confidence score to output a calibrated semantic confidence score for the current usage scenario.

* * * * *